Nov. 21, 1961 J. M. RHOADES 3,010,063
POSITION INDICATING DEVICE
Filed April 1, 1959 3 Sheets-Sheet 1
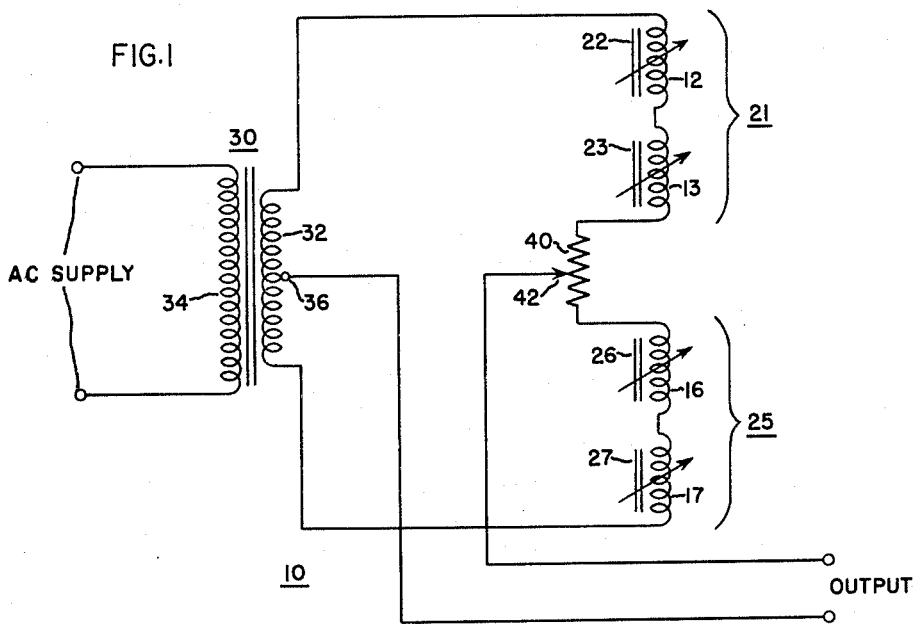
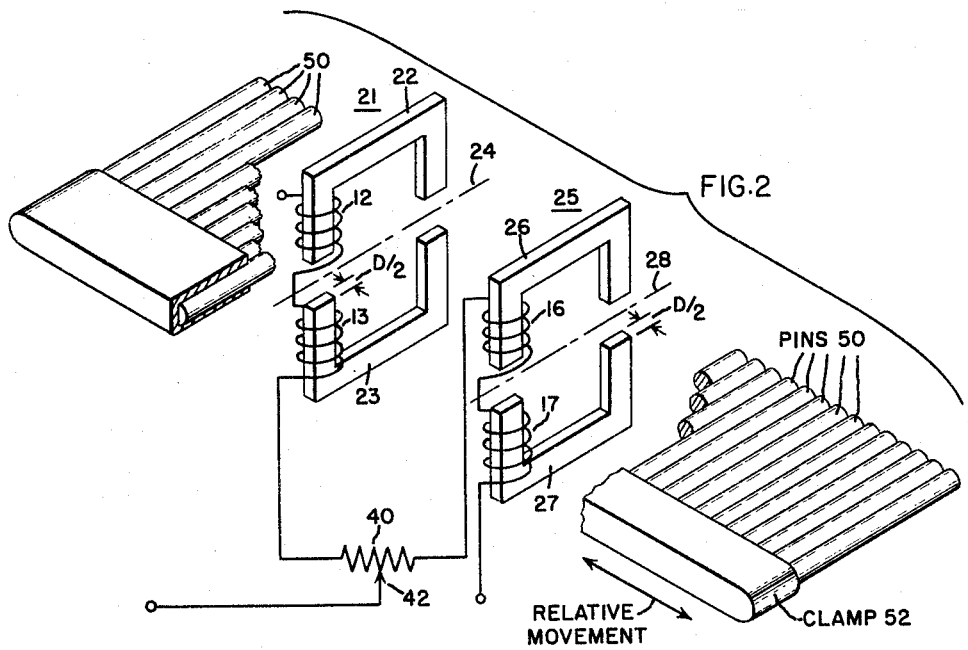
INVENTOR:
JOHN M. RHOADES,
BY *Melvin M. Goldenberg*
HIS ATTORNEY.

Nov. 21, 1961    J. M. RHOADES    3,010,063
POSITION INDICATING DEVICE
Filed April 1, 1959    3 Sheets-Sheet 2
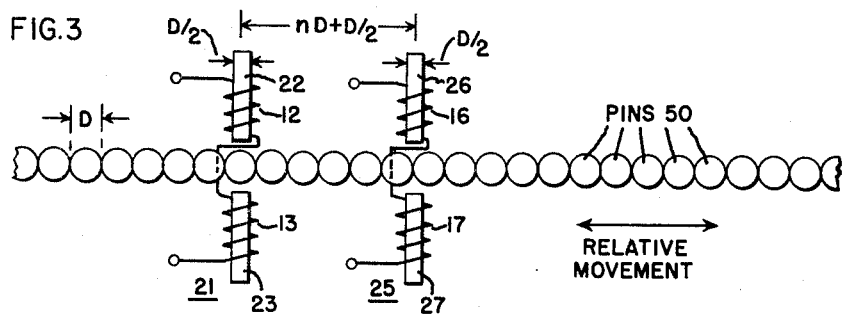
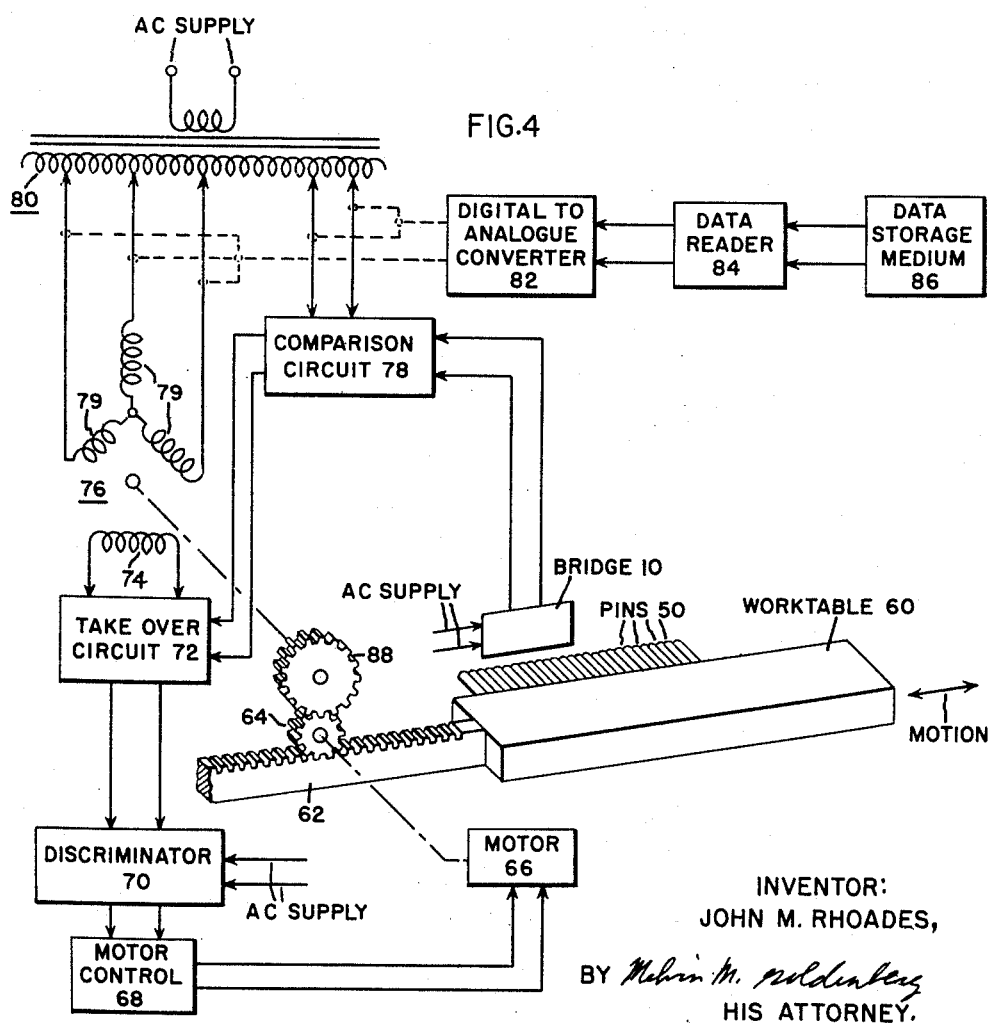
INVENTOR:
JOHN M. RHOADES,
BY *Melvin M. Goldenberg*
HIS ATTORNEY.

Nov. 21, 1961 J. M. RHOADES 3,010,063
POSITION INDICATING DEVICE
Filed April 1, 1959 3 Sheets-Sheet 3

INVENTOR:
JOHN M. RHOADES,
BY *Melvin M. Goldenberg*
HIS ATTORNEY.

United States Patent Office 3,010,063
Patented Nov. 21, 1961

3,010,063
POSITION INDICATING DEVICE
John M. Rhoades, Waynesboro, Va., assignor to General Electric Company, a corporation of New York
Filed Apr. 1, 1959, Ser. No. 803,426
16 Claims. (Cl. 323—75)

The invention relates to a position indicating device, and particularly to such a device that produces an electrical signal which is indicative of the relative position of the device and some object, and which can be used for controlling this relative position.

An object of the invention is to provide an improved position indicating device.

Another object of the invention is to provide an improved position indicating device which utilizes relatively inexpensive components.

Another object of the invention is to provide a position indicating device that has high resolving powers and at the same time that is capable of producing a usable signal level indicative of this position.

Another object of the invention is to provide an improved position indicating device which supplies an electrical signal that may be readily utilized to control a small relative movement between the indicating device and an object.

Another object of the invention is to provide an improved position indicating device that utilizes relatively inexpensive components and that provides accurate indications of the relative position between the device and an object.

Another object of the invention is to provide an improved position indicating device that can be compatibly used with existing selsyn systems without the addition of a different frequency alternating current supply.

In a control device which positions two objects, such as a machine tool and work, in some relative position, a good indication of this relative position is highly desirable, if not essential. Where the accuracy of the relative positioning is to be maintained to a high degree, it may be necessary to use a number of known selsyn devices to provide the requisite accurate indication of the relative positioning. As the number of such selsyn devices increases, the expense of the control device likewise increases. The present invention provides an improved and accurate position indicating device which is relatively inexpensive and simple.

In accordance with the invention, the position indicating device utilizes a bridge network arrangement. The unbalance in this bridge network causes a signal to be generated, the magnitude and polarity of which represent the degree of unbalance. One side of the bridge network comprises two substantially similar inductive reactances which are connected in series, and the other side of the bridge network comprises a source of alternating current potential having a center tap. The two sides of the bridge network are connected together in parallel. The object, whose relative position with the indicating device is to be controlled, may be provided with a magnetic material having at least one surface thereof formed by a plurality of substantially similar profiles. Such a surface is easily and, in accordance with the invention, preferably obtained by highly accurate and relatively inexpensive cylindrically shaped pins that are made of a magnetic material and that are positioned side by side to provide such a surface. The object and the indicating device are so positioned relative to each other that the surface of the magnetic material on the object is in the vicinity of but is spaced from the reactances. Output means are coupled between the center tap of the voltage source and the connection between the two reactances for deriving an electrical signal which varies in accordance with the degree of unbalance in the bridge network. The unbalance varies with the relative position of the indicating device and the surface of the magnetic material on the object. This derived electrical signal may vary in phase or amplitude and may be used in a control device to bring about the necessary or desired positioning functions.

The invention will be better understood from the following description taken in connection with the accompanying drawing and its scope will be pointed out in the claims. In the drawing:

FIGURE 1 shows a schematic diagram of one embodiment of the position indicating device;

FIGURE 2 shows a perspective view of the component parts used in the diagram of FIGURE 1, with a portion of the parts broken away for clarity;

FIGURE 3 shows an elevation of the component parts of FIGURE 2 for explaining the operation and positioning of the component parts;

FIGURE 4 shows the position indicating device in accordance with the invention as it might be used in a position control system;

Figure 5:
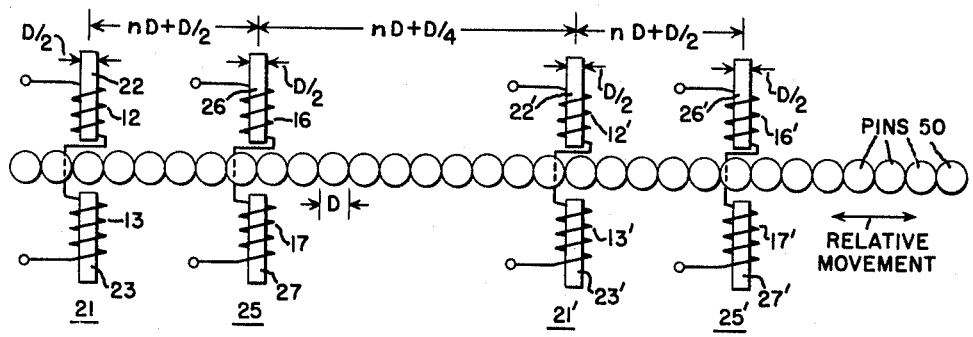
FIGURE 5 shows an elevation of the component parts as used in another embodiment of the invention.

In the various figures, the same reference numerals are used to refer to the same elements. The position indicator device shown schematically in FIGURE 1 comprises a bridge network 10. One side of this bridge network 10 comprises four serially connected inductances or coils 12, 13, 16, 17 which are wound about respective cores 22, 23, 26, 27. The four coils 12, 13, 16, 17 and their respective cores 22, 23, 26, 27 are made as similar in physical and electrical characteristics as is practical. The other side of the bridge network 10 comprises a suitable source of alternating current. This alternating current may be supplied by a secondary winding 32 of a transformer 30, the primary winding 34 of which is connected to the alternating current supply for energizing the bridge network 10. Use of the transformer 30 is preferred as it enables the secondary voltage to be set at the desired magnitude and it also provides isolation. The secondary winding 32 is provided with a center tap 36 which is positioned as close as possible to the electrical center of the secondary winding 32. The physical configuration and arrangement of the coils 12, 13, 16, 17 and their respective cores 22, 23, 26, 27 are shown in the perspective view of FIGURE 2. The cores 22, 23, 26, 27 may be generally described as C-shaped, and are formed from a magnetic material having a rectangular cross section. Two of the cores 22, 23 form a first core unit 21, and the other two cores 26, 27 form a second core unit. The respective cores of each of the core units 21, 25 are symmetrically positioned on opposite sides of respective core unit axes 24, 28, and are positioned in a common plane which substantially passes through the respective unit axes 24, 28. The respective planes of the two core units 21, 25 are positioned so that they are substantially parallel to each other. Likewise, the unit axes 24, 28 are positioned so that they are substantially parallel to each other. The ends of the respective cores are plane and rectangularly shaped, and are positioned in the vicinity of each other to form two substantially similar air gaps in each of the core units 21, 25. It is preferable that all four air gaps so formed have substantially the same electrical characteristics, and be symmetrical with respect to the unit axes 24, 28. It is also preferable that the ends of the cores 22, 26 on one side of the two axes 24, 28 lie in a common plane, and that the ends of the cores 23, 27 on the other side of the axes 24, 28 lie in a common plane. And it is preferable that the two planes be parallel to each other and to the unit axes 24, 28, and that the two planes be equally spaced from the unit axes 24, 28. The coils 12 and 13 of the first core unit 21 are preferably wound and connected in series so that the flux produced by one coil 12 aids the flux produced by the other coil 13. Similarly, the coils 16, 17 of the second core unit 25 are preferably wound and connected in series so that the flux produced by one coil 16 aids the flux produced by the other coil 17. The coils 12, 13 of the first core unit 21 are connected in series with coils 16, 17 of the second core unit 25 through a balancing resistor 40 which has a movable contact 42 that engages the balancing resistor 40 over its movement. With the coils 12, 13, 16, 17 serially connected, the secondary winding 32 of the transformer 30 is connected in parallel across the coils 12, 13, 16, 17 so that any voltage produced by the secondary winding 32 is applied across the coils 12, 13, 16, 17.

A suitable alternating current supply may be 115 volts, 60 cycles. A supply of 115 volts, at a frequency of 420 cycles or higher is preferable as some of the circuit components may be made physically smaller. When this supply is applied to the primary winding 34, a voltage then appears across the secondary winding 32 and across the serially connected coils 12, 13, 16, 17. If the center tap 36 of the secondary winding 32 is properly located at the electrical center of the secondary winding 32, and if the movable contact 42 of the balancing resistor is located so that the impedance of one set of coils 12, 13 and a portion of the balancing resistor 40 equals the impedance of the other set of coils 16, 17 and the remainder of the balancing resistor 40, then the voltage drop from either side of the secondary winding 32 to the center tap 36 and to the movable contact 42 of the balancing resistor 40 is substantially half the total voltage across the secondary winding 32. Under this balanced condition, the voltage at the center tap 36 with respect to a given point is equal to the voltage at the movable contact 42 with respect to the same given point, and no net voltage appears between the center tap 36 and the movable contact 42. Hence no output voltage is produced at the output terminals. However, if any change in impedance occurs in any one of the coils 12, 13, 16, 17 then the voltage drop across one set of coils 12, 13 then becomes different from the voltage drop across the other set of coils 16, 17 and the movable contact 42 is then at a different potential with respect to some point than is the center tap 36. As a result of this situation, some voltage will appear at the output terminals, the magnitude and polarity of this output voltage depending upon the relative amount and direction of impedance change between the two sets of coils 12, 13, 16, 17.

This impedance change may be brought about and utilized in accordance with the invention preferably by means of a plurality of cylindrically shaped pins 50 of magnetic material. In the arrangement shown in FIGURES 2 and 3, the pins 50 are firmly held by means of a suitable support or clamp 52 so that their cylindrical sides are in close contact with each other and so that their longitudinal axes are substantially parallel with each other and pass through a predetermined line. The configuration of the predetermined line depends upon the nature of the relative movement between the pins 50 and the core units 21, 25. In FIGURES 2 and 3, it is contemplated that this relative movement is along a straight line. Hence, the longitudinal axes of the pins 50 pass through a straight line. However, this relative movement could be along a line that is not straight, such as the arc of a circle. In this case, the longitudinal axes of the pins 50 would pass through such an arc or line that is not straight. Thus, the pins 50, when held by the clamp 52, provide a surface formed by a plurality of similar semi-circular profiles. These profiles are shown in the elevation of FIGURE 3. The pins 50 have a length along their longitudinal axes which is preferably somewhat longer than the distance between the ends of any of the cores so that the full depth of all of the air gaps is occupied by a pin or pins 50. As the pins 50 and the cores 22, 23, 26, 27 are moved relative to each other, the reluctance of the air gaps is changed in accordance with the amount of cross sectional area of the pins 50 present in the air gaps. And, as the air gap reluctance changes, the reluctances of the magnetic paths through the cores 22, 23, 26, 27 also change. The change in reluctances of the magnetic paths changes the impedance of the coils 12, 13, 16, 17. If the impedance change of the coils 12, 13 of the first core unit 21 is different from the impedance change of the coils 16, 17 of the second core unit 25, then an unbalance exists in the bridge network 10. This unbalance produces an alternating current output voltage whose magnitude and polarity indicate the amount and direction of unbalance. This output voltage can be used to indicate the relative position of the pins 50 and the cores 22, 23, 26, 27.

The variation in magnitude of the output voltage produced as a result of the relative motion of the pins 50 and the cores 22, 23, 26, 27 can have many shapes. One shape which is preferred for positioning control is a sine wave, as a sine wave is frequently and generally used in positioning control devices utilizing inductive devices. Hence, if the position indicating device in accordance with the invention also produces a modulated alternating current whose magnitude varies sinusoidally, it can be used compatibly and readily with such positioning control devices. If the pins 50 have a cylindrical shape (i.e., a circular cross section) and if the ends of the cores 22, 23, 26, 27 are substantially plane surfaces having a rectangular shape of a predetermined width that is made one half of the pin diameter D, then the relative motion of the pins 50 and the core units 21, 25 shown in FIGURES 2 and 3 will produce an output alternating current voltage whose magnitude varies sinusoidally with this relative motion. While the arrangement shown and described contemplates the use of two coils and cores in each core unit, it is possible to have only one coil and core in each core unit. Thus with respect to FIGURE 2, the left-hand ends of the two cores 22, 23 of the first core unit 21 could be joined together to form a single core and the left-hand ends of the two cores 26, 27 of the second core unit 25 could be joined together to form a single core. The right-hand ends of the respective cores would be left unjoined as shown in FIGURE 2 to permit the pins 50 and the clamp 52 to pass therethrough. However, the use of two coils and cores in each core unit is preferred because the effect of motion of the pins in a transverse direction toward the cores is reduced. Thus, the accuracy and quality of the indicating device is improved.

In FIGURE 3, it can be seen that the axis 24 of the first core unit 21 is positioned some integral multiple $n$ of pin diameters D plus one half a pin diameter D (electrically equivalent to an integral multiple of 360 degrees plus 180 degrees) from the axis 28 of the second core unit 25. This spacing is preferable because it enables the maximum magnitude of output voltage to be obtained from a given arrangement when the pins 50 and core units 21, 25 have a certain relative position. The relative position (zero degrees) of the pins 50 and the cores 22, 23, 26, 27 as shown in FIGURE 3 is the position of maximum unbalance in one direction of the bridge network 10. This is because the air gap between the cores 22, 23 of the first core unit 21 is at a minimum, whereas the air gap between the cores 26, 27 of the second core unit 25 is at a maximum. For this relative position, the output voltage is at a maximum in one direction, for example, a positive direction. As the core units 21, 25 and pins 50 are moved relative to each other, these air gaps change. When the core units 21, 25 and pins 50 have moved a relative distance (equivalent to 90 degrees) equal to one-fourth the pin diameter D from the relative position shown in FIGURE 3, then all of the air gaps have equal reluctances. Consequently, the output voltage is substantially zero for this relative position. As the core units 21, 25 and pins 50 continue to move in the same relative direction, the air gap between the cores 22, 23 of the first core unit 21 becomes a maximum and the air gap between the cores 26, 27 of the second core unit 25 becomes a minimum when the relative distance moved from the relative position shown in FIGURE 3 is one half the pin diameter D (equivalent to 180 degrees). At this distance, the bridge network 10 has its maximum unbalance in the other direction. Hence, the output voltage is a maximum in the other (negative for the example assumed) direction. During subsequent relative motion in the same direction, the output voltage will become subsequently zero when the relative distance moved is three-fourths the pin diameter D (equivalent to 270 degrees). And finally, after the relative distance moved is one pin diameter D, the core units 21, 25 and the pins 50 will have the original relative position shown in FIGURE 3. Thus, the arrangement in accordance with the invention provides an alternating current output whose magnitude and polarity change sinusoidally in accordance with the relative movement. This relative movement of one pin diameter D provides an output voltage that is similar to the voltage of a selsyn transformer rotor going through one revolution. This output voltage can be utilized in various ways to indicate the relative position of the pins 50 and the core units 21, 25.

The arrangement described preferably uses cylindrically shaped pins because such pins are easily produced in large quantities with a high degree of accuracy. For example, pins accurate to fifty-millionths of an inch in diameter can be easily and inexpensively obtained. However, other profiles and configurations can be used. For example, the two semi-circular profiles could be obtained by machining such profiles from one solid piece of material. Such an arrangement would eliminate the necessity for clamping the pins tightly together side by side. In addition, the profiles could take other forms, such as a triangular form or a curved form other than circular. And, it is also possible that the repeating profile appear on one side of the material only, the other side being plane or flat. In such a case, it might be possible to use only the cores on the one side having the formed profile. No cores would necessarily be needed on the flat or plane side. However, as pointed out, the semi-circular profiles provided by cylindrically shaped pins are preferably because they can be used to generate an output voltage whose magnitude varies sinusoidally with relative movement.

Several embodiments in accordance with FIGURES 1, 2, and 3 have been built and successfully operated. In one embodiment, an alternating current supply of 40 volts and 420 cycles was applied across the coils of the cores. The respective cores of each core unit were spaced to provide an air gap of 0.116 inch. A number of pins each having a diameter of 0.100 inch were used. As the pins and core units were moved relative to each other, an output voltage of 420 cycles was produced at the output terminals, this output voltage having a magnitude which varied sinusoidally and which recurred for every 0.100 inch of relative movement. The output voltage had a maximum peak amplitude that was approximately 0.85 volt, and that accurately varied sinusoidally to within 0.001 inch of relative movement.

One practical application of the position indicating device in accordance with the invention is shown in a positioning control system in FIGURE 4. As an illustrative example, it is assumed that the positioning control system comprises a worktable 60 that is to be moved under some machine tool which performs some operation on work mounted on the worktable 60. The worktable 60 is moved by means of a rack 62 which is driven by a pinion gear 64. The pinion gear 64 is coupled to a motor 66 which revolves in the proper direction to turn the pinion gear 64 and move the worktable 60 as desired. The motor is energized from a motor control 68 such as shown and described in Patent No. 2,764,720, issued to L. U. C. Kelling on September 25, 1956. The motor control 68 is supplied with an error signal from a discriminator 70, such a discriminator also being described in the above-mentioned patent. The discriminator 70 compares a signal from a takeover circuit 72, also described in the above-mentioned patent, with the signal supplied by a suitable alternating current (A.C.) supply. The discriminator 70 produces an error signal having a magnitude proportional to a predetermined difference between the A.C. supply signal and the control signal supplied by the takeover circuit 72. The takeover circuit 72 is also described in the above-mentioned patent, and serves to sequentially select a signal from any one of a plurality of control signal sources. One or more control signals are derived from one or more rotor windings or rotors 74 of one or more selsyn transformers 76, and another control signal is derived from a comparison circuit 78 which, in turn, is supplied with a signal from the bridge network 10 in accordance with the invention. As is known to those skilled in the art, the stator windings or stators 79 of the selsyn transformer 76 may be supplied with predetermined voltages, in accordance with a predetermined program, from a suitable source such as the tapped transformer 80. The taps supplying the stator windings 79 may be moved or switched to provide the stator windings 79 with a voltage which indicates the desired position of the worktable 60. The taps of the transformer 80 may be mechanically moved or switched by a digital-to-analogue converter 82 which is supplied with digital signals from a data reader 84. The data reader 84 reads the data supplied by a data storage medium 86 such as punched cards or tape. Coupled to the rotor 74 is an indicator gear 88 which is meshed with the pinion gear 64. The operation of the selsyn transformer 76 is such that the rotor 74 has induced in it a voltage which, when applied through the takeover circuit 72, the discriminator 70, and the motor control 68, tends to cause the motor 66 to rotate until no voltage exists across the rotor 74. The worktable 60 is moved toward the desired position at the same time. This arrangement, in effect, provides a positioning control for the worktable 60. It is to be understood that more than one selsyn transformer 76 can be used, such as a plurality of selsyn devices as shown in the above-mentioned patent. Once the motor 66 has rotated the pinion gear 64 and the indicator gear 88, which drives the rotor 74, to the position where very little if any voltage exists in the rotor 74, the takeover circuit 72 then selects the voltage produced by the comparison circuit 78. Such a circuit is known in the art, and may have various forms such as shown at pages 335–356 of "Waveforms," volume 19 of the Radiation Laboratory Series, first edition, published in 1949 by McGraw-Hill Book Company, Inc. The comparison circuit 78 in effect provides a voltage indicative of the relative value of the voltage generated by the bridge network 10 and a predetermined voltage selected from the supply transformer 80. This predetermined voltage is also selected in accordance with a predetermined program so as to indicate (with relation to the bridge network 10 and the pins 50) the desired position of the worktable 60. The difference between the voltage generated by the bridge network 10 and the predetermined voltage is applied to the takeover circuit 72, through the discriminator 70 and the motor control 68, and to the motor 66 which rotates the pinion gear 64 to position the worktable 60 until the pins 50 acting with the bridge network 10 produce substantially the same voltage as the predetermined voltage. In this condition, no further control signal is applied to the motor 66, and the control device comes to a rest. After the work operation is performed some new voltages may be selected from the secondary winding of the supply transformer 80 to cause the worktable 60 to be moved to a new position.

The application of the position indicating device in accordance with the invention described in connection with FIGURE 4 contemplated a positioning control system that moved along only one line of motion. It is to be understood that the position indicating device in accordance with the invention can be used equally well with a positioning control system that has motion in more than one direction. An example of such a system might be one which moves an object in both the horizontal direction and the vertical direction.

As will be appreciated by those skilled in the art, a sinusoidal waveform has a relatively small slope in the regions where the waveform reverses direction at the peaks. Hence, in a positioning control device of the type just described, the change in these regions of the voltage magnitude of the sinusoidal output signal from the bridge network 10 varies relatively little for a comparatively large relative motion between the pins and the cores. As a result, the positioning provided by such a signal may not be as accurate as desired. The accuracy can be improved by the use of a positioning control system having a motor control which drives a motor in accordance with the phase of a control signal. A control signal whose phase indicates relative position can be provided in accordance with the invention by using two complete bridge networks 10 such as shown in FIGURES 1, 2 and 3. Each of these comprises two core units 21, 25, and 21', 25' respectively, and four coils 12, 13, 16, 17, and 12', 13', 16', 17' respectively, arranged as shown in FIGURE 5. Adjacent core units 25, 21' are spaced apart some integral multiple $n$ of pin diameters D plus a distance equal to one-fourth the pin diameter D (electrically equivalent to an integral multiple of 360° plus 90°). One bridge network may be excited by a supply voltage of a given phase, and the other bridge network may be excited with a voltage which either leads or lags the phase of the one network by 90°. The output signals from the two bridge networks may be combined to provide a signal having a substantially constant magnitude but whose phase varies in accordance with the relative position of the pins and the two bridge networks. The phase rotates through 360 degrees for a relative movement of one pin diameter D. Further, the phase changes linearly with the relative movement. Thus, the invention can be used with a phase sensitive positioning system.

Figure 6:
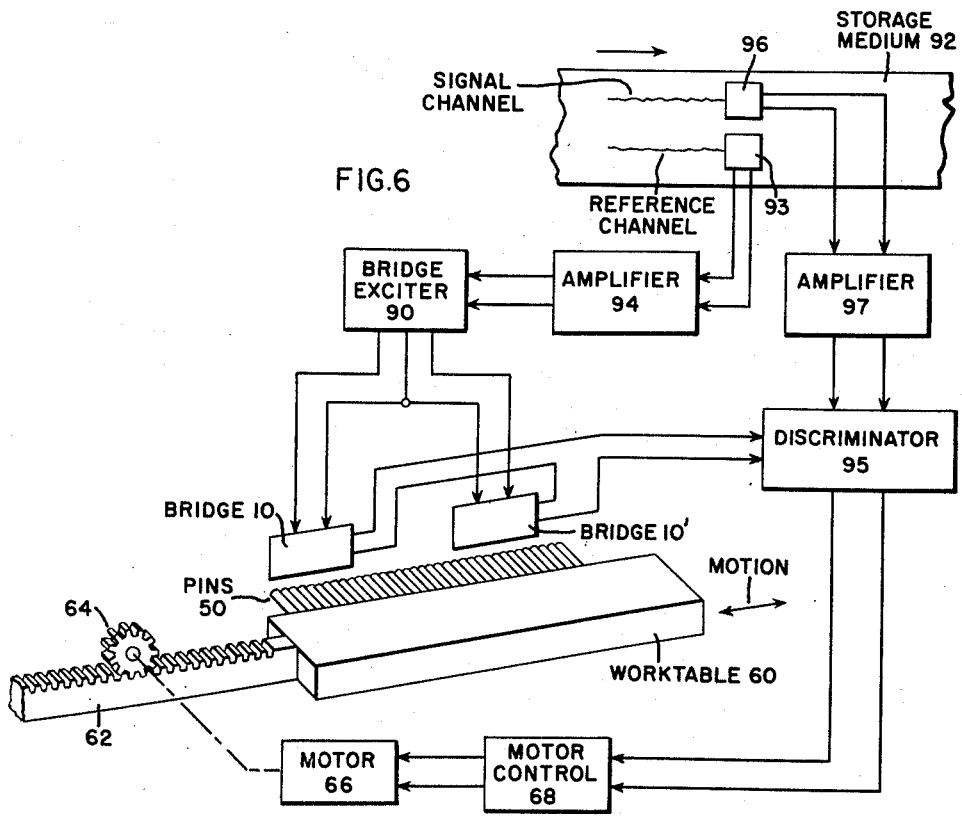
FIGURE 6 shows the position indicating device in accordance with the invention as it might be used in another position control system.

One practical application of the position indicating device just described is shown in a control system in FIGURE 6. The portions of the system not comprising the invention are known in the art, an example of such a system being shown in Patent No. 2,866,145, issued to Lawrence R. Peaslee et al. on December 23, 1958. The system may comprise a worktable 60 which is intended to move in the direction shown. The worktable 60 may be moved in the same manner as shown in FIGURE 4, namely by means of a rack 62 and pinion gear 64 driven by a motor 66. The motor is operated in accordance with signals from a motor control 68 as in the manner of the system of FIGURE 4. As mentioned in connection with FIGURE 5, the invention may be utilized to provide a constant amplitude signal whose phase varies in accordance with the relative position of the pins 50 and the two bridge networks 10 and 10'. As mentioned, the bridge networks 10, 10' each comprise two complete core units 21, 25, 21', 25' and their respective coils. The bridge networks 10, 10' are excited by voltages which are respectively 90 degrees out of phase with each other, such voltages being provided from a bridge exciter 90. The bridge exciter 90 provides, in effect, two or more voltages having a predetermined phase relationship (in this case 90 degrees) from a signal, such an exciter being shown and described in the above-mentioned patent. The bridge exciter 90 is supplied with a signal from a reference channel recorded on a suitable storage medium 92 such as a magnetic tape. The signal of the reference channel is picked up by a suitable reading device 93, and is amplified in an amplifier 94 and applied to the bridge exciter 90. The output signals of the bridge networks 10, 10' are combined and provide a constant amplitude signal whose phase varies in accordance with the relative position of the bridge networks 10, 10' and the pins 50. As also described in connection with FIGURE 5, the coils and core units of the respective bridge networks 10, 10' are spaced a predetermined distance. The output signal of the bridge networks 10, 10' is applied to a phase discriminator 95 which compares the relative phase of the signal from the bridge networks 10, 10' with the phase of a signal derived from a signal channel on the storage medium 92. The signal channel carries the intelligence or information to be conveyed. This signal is picked up by a suitable reading device 96, amplified in an amplifier 97, and applied to the discriminator 95. The discriminator 95 compares the phase of the signal from the bridge networks 10, 10' with the phase of the signal from the signal channel on the storage medium 92, and produces an output signal indicative of the relative phase. This output signal has the characteristics needed to provide the motor control 68 with the necessary information to cause the motor 66 to rotate the pinion gear 64 so as to position the worktable 60 in accordance with the signal derived from the signal channel. When the worktable 60 is in the position called for by the signal from the signal channel, the discriminator 95 no longer produces a signal, and the motor 66 stops. As already mentioned, such a system, utilizing selsyn devices rather than the position indicating device in accordance with the invention, is known in the art and reference is again made to Patent No. 2,866,145 for a more complete explanation of such a system. And, as mentioned in connection with FIGURE 4, the invention can be used in systems as shown in FIGURE 6 to provide motion in a plurality of directions.

From the above description, it will be seen that a position indicating device in accordance with the invention may be easily produced from components which are relatively inexpensive and which have a high degree of accuracy. The position indicating device in accordance with the invention is compatible with conventional selsyn systems, and may be used in cooperation with such selsyn systems, or may be used to supplement and replace such selsyn systems. In addition to being accurate and relatively inexpensive, a position indicating device in accordance with the invention has the advantage that moving parts do not come in direct physical contact with one another, thus eliminating the possibility of inaccuracy as a result of wear. While the invention has been described with reference to particular embodiments, it is to be understood that modifications may be made by persons skilled in the art without departing from the spirit of the invention or from the scope of the claims.

What I claim as new and desire to secure by Letters Patent of the United States is:

1. A device for producing an electrical signal indicative of relative position comprising a first inductive reactance, a second inductive reactance, first means coupling said reactances in series, a source of alternating current potential having an electrical center, means coupling said potential source across said serially coupled reactances, an element formed of a magnetic material having at least one surface thereof formed by a plurality of substantially similar profiles, means positioning said element with said surface in the vicinity of but spaced from said reactances so that the magnitudes of both said reactances are varied in response to said relative position, and output means coupled between said first means and said electrical center for deriving said electrical signal.

2. A device for producing an electrical signal indicative of relative position comprising a first inductive reactance, a second inductive reactance, first means coupling said reactances in series, a source of alternating current potential having a center tap, means coupling said potential source across said serially coupled reactances, a plurality of elongated magnetic pins, means positioning said pins so that said pins are in the vicinity of but are spaced from said reactances, and output means coupled between said first means and said center tap for deriving said electrical signal.

3. A device for producing an electrical signal indicative of relative position comprising a bridge network; said bridge network having first, second, third, and fourth corners arranged in that order in one direction around said network, a first inductive reactance coupled between said first and second corners, a second substantially similar inductive reactance coupled between said second and third corners, a source of alternating current potential having outer terminals and a center tap, means coupling one of said outer terminals to said third corner and the other of said outer terminals to said first corner, means coupling said center tap to said fourth corner; an element comprising a magnetic material having at least one surface thereof formed by a plurality of substantially similar profiles; means positioning said element and said reactances relative to each other with said surface in the vicinity of but spaced from said reactances; and output means coupled to said second and fourth corners for deriving said electrical signal.

4. A device for producing an electrical signal indicative of relative position comprising a first inductive reactance, a second substantially similar inductive reactance, first means coupling said reactances in series, a source of alternating current potential having a center tap, means coupling said potential source across said serially coupled reactances, an element comprising a magnetic material having one surface thereof formed by a plurality of substantially similar predetermined profiles, means positioning said element with said surface in the vicinity of but spaced from said reactances so that the magnitudes of both said reactances are varied in response to said relative position, and output means coupled between said first means and said center tap for deriving said electrical signal.

5. A device for producing an electrical signal indicative of relative position comprising a first inductive reactance, a second substantially similar inductive reactance, first means coupling said reactances in series, a source of alternating current potential having a center tap, means coupling said potential source across said serially coupled reactances, a plurality of substantially similar cylindrically shaped magnetic pins located side by side, means positioning said pins in the vicinity of but spaced from said reactances, and output means coupled between said first means and said center tap for deriving said electrical signal.

6. A device for producing an electrical signal indicative of relative position comprising a first coil wound on a first magnetic core, a second coil wound on a second magnetic core, said coils and said cores being respectively substantially similar, first means coupling said first and second coils in series, a source of alternating current potential having a center tap, means coupling said potential source across said serially coupled coils, a plurality of elongated magnetic elements having substantially similar cross sections, means for positioning and holding said elements side by side along a predetermined line, means positioning said coils and cores a predetermined distance from each other and in the vicinity of but spaced from said magnetic elements so that the reactive magnitudes of both said coils are varied in response to said relative position, and output means coupled between said first means and said center tap for deriving said electrical signal.

7. A device for producing an electrical signal indicative of relative position comprising a first magnetic core having a predetermined cross section, a first coil wound on said first core, a second magnetic core substantially similar to said first core, a second coil substantially similar to said first coil wound on said second core, first means coupling said first and said second coils in series, means positioning said cores a predetermined distance from each other, a source of alternating current potential having an electrical center, means coupling said source across said serially coupled coils, a plurality of substantially similar cylindrically shaped magnetic elements, means positioning and holding said elements with the cylindrical sides of said elements in contact with each other and with the longitudinal axes of said elements substantially parallel, said longitudinal axes lying along a predetermined line, means positioning said elements in the vicinity of but spaced from said cores, and output means coupled between said first means and said electrical center for deriving said electrical signal.

8. A device for producing an electrical signal indicative of relative position comprising a first magnetic core having a substantially rectangularly shaped cross section, a first coil wound on said first core around said cross section thereof, a second magnetic core substantially similar to said first core, a second coil substantially similar to said first coil wound on said second core around said cross section thereof, first means coupling said first and second coils in series, means positioning said cores a predetermined distance from each other with said cross sections lying in parallel planes, a source of alternating current voltage having a center tap, means coupling said source across the free ends of said serially coupled coils, a plurality of substantially similar cylindrically shaped magnetic elements, means positioning and holding said elements with the cylindrical sides of said elements in contact with each other and with the longitudinal axes of said elements substantially parallel, said longitudinal axes passing through a predetermined line, means positioning said elements in the vicinity of but substantially equally spaced from said cores, and output means coupled between said first means and said center tap for deriving said electrical signal.

9. An arrangement for producing an electrical signal having a magnitude and polarity indicative of the relative position of two objects comprising a first magnetic core having one end substantially plane and rectangularly shaped, a first coil wound around said first core near said one end thereof, a second magnetic core substantially similar to said first core, a second coil substantially similar to said first coil wound around said second core near said one end thereof, first means coupling one end of said first coil to one end of said second coil, means postioning said cores a predetermined distance from each other with said ends lying in a common plane, a source of alternating current potential having a center tap, means coupling said source between the other ends of said coils, a plurality of substantially similar cylindrically shaped magnetic elements, means positioning and holding said elements on one of said objects with the cylindrical sides of said elements in contact with each other and with the longitudinal axes of said elements substantially parallel, said longitudinally axes lying along a predetermined line on said one object, means positioning said one object so that said elements are in the vicinity of but spaced from said ends of said cores, and output means coupled between said first means and said center tap for deriving said electrical signal.

10. A device for producing an electrical signal having a magnitude and polarity indicative of the relative position of two objects comprising a first magnetic core having one end thereof that is substantially plane and rectangularly shaped, a first coil wound on said first core near said one end thereof, a second magnetic core substantially similar to said first core, a second coil substantially similar to said first coil wound around said second core near said one end thereof, a balancing resistor having a movable contact, means coupling one end of said resistor to one end of said first coil and the other end of said resistor to one end of said second coil, means positioning said cores a predetermined distance from each other on one of said objects with said one end lying in a common plane, a source of alternating current potential having a center tap, means coupling said source between the other ends of said coils, a plurality of substantially similar cylindrically shaped magnetic pins, said pins having a radius substantially equal to the smaller of the dimensions of said rectangular core ends, means positioning and holding said pins on the other of said objects with the cylindrical sides of said pins in contact with each other and with the longitudinal axes of said pins passing through a predetermined line on said other object, means positioning said two objects for relative movement with each other so that said pins are in the vicinity of but spaced from said ends of said cores and so that the direction of said relative movement is substantially along said predetermined line and substantially along said smaller end dimension of said cores, and output means coupled between said movable contact and said center tap for deriving said electrical signal.

11. A device for producing an electrical signal having a magnitude and polarity indicative of the relative position of two objects comprising a first magnetic core having one end thereof that is substantially plane, said one end being in the shape of a rectangle having a predetermined width, a first coil wound on said first core near said one end thereof, a second magnetic core substantially similar to said first core, a second coil substantially similar to said first coil wound around said second core near said one end thereof, a balancing resistor having a movable contact, means coupling one end of said resistor to one end of said first coil and the other end of said resistor to one end of said second coil, an alternating current transformer having a secondary winding with a center tap, means coupling said secondary winding between the other ends of said coils, a plurality of substantially similar cylindrically shaped magnetic pins, said pins having a radius substantially equal to said predetermined width of said core ends, means positioning and holding said pins on one of said objects with the cylindrical sides of said pins in contact with each other and with the longitudinal axes of said pins substantially parallel to each other, said longitudinal axes passing through a predetermined line on said object, means positioning said cores from each other on the other of said objects at a distance substantially equal to an odd integral multiple of said pin radius with said one end of said cores lying in a common plane, means positioning said two objects for relative movement with each other so that said pins are in the vicinity of but spaced from said one end of said cores and so that the direction of said relative movement is substantially along said predetermined line and substantially parallel to said predetermined end width, and output means coupled between said movable contact and said center tap for deriving said electrical signal.

12. A device for producing an electrical signal having a magnitude and polarity indicative of the relative position of two objects comprising a first core unit having a pair of substantially similar C-shaped magnetic cores having plane ends that lie in a single plane and that have the shape of a rectangle having a predetermined width, a coil wound on each of said cores, said coils being substantially similar, first means connecting said coils in series, a second core unit substantially similar to said first core unit and including said cores, said coils, and said first means connecting said coils in series, a balancing resistor having a movable contact, means coupling one end of said resistor to one free end of said coils of said first core unit and the other end of said resistor to one free end of said coils of said second core unit, an alternating current transformer having a secondary winding with a center tap, means coupling said secondary winding between the other free ends of said coils of said first and second core units, means positioning the respective cores of each of said core units in a symmetrical manner on opposite sides of a unit axis with said ends of said cores in the vicinity of each other to form an air gap along said unit axis and with said cores lying in a common plane, a plurality of substantially similar cylindrically shaped magnetic pins, said pins having a radius substantially equal to said predetermined width of said core ends, means positioning and holding said pins on one of said objects with the cylindrical sides of said pins in contact with each other and with the longitudinal axes of said pins substantially parallel to each other, said longitudinal axes passing through a predetermined line on said one subject, means positioning said core units on the other of said objects with said common plane and said unit axis of said first core unit substantially parallel to said common plane and said unit axis of said second core unit, said common planes being spaced from each other a distance substantially equal to an odd integral multiple of said pin radius, means positioning said two objects for relative movement with each other so that said pins are positioned in said air gaps but are spaced from said ends of said cores and so that the direction of said relative movement is substantially along said predetermined line and so that said longitudinal axes are substantially parallel to said unit axes, and output means coupled between said movable tap and said center tap for deriving said electrical signal.

13. A device for producing an electrical signal having a phase indicative of the relative position of two objects comprising a first bridge network having a first magnetic core having one end substantially plane and rectangularly shaped, a first coil wound around said first core near said one end thereof, a second magnetic core substantially similar to said first core, a second coil substantially similar to said first coil wound around said second core near said one end thereof, first means coupling one end of said first coil to one end of said second coil, means positioning said cores a predetermined distance from each other with said ends lying in a common plane, a source of alternating current potential having a center tap, means coupling said source between the other ends of said coils, and output means coupled between said first means and said center tap; a second bridge network substantially similar to said first bridge network; means positioning said bridge networks on one of said objects; a plurality of substantially similar cylindrically shaped magnetic elements; means positioning and holding said elements on the other of said objects with the cylindrical sides of said elements in contact with each other and with the longitudinal axes of said elements substantially parallel, said longitudinal axes lying along a predetermined line on said other object; and means positioning said two objects so that said elements are in the vicinity of but spaced from said ends of said cores of said bridge networks.

14. A device for producing an electrical signal having a phase indicative of the relative position of two objects comprising: a first bridge network having a first magnetic core having one end thereof that is substantially plane and rectangularly shaped, a first coil wound on said first core near said one end thereof, a second magnetic core substantially similar to said first core, a second coil substantially similar to said first coil wound around said second core near said one end thereof, a balancing resistor having a movable contact, means coupling one end of said resistor to one end of said first coil and the other end of said resistor to one end of said second coil, means positioning said cores a predetermined distance from each other with said ends lying in a common plane, a source of alternating current potential having a center tap, means coupling said source between the other ends of said coils, and first output means coupled between said movable contact and said center tap for deriving said electrical signal; a second bridge network substantially similar to said first bridge network; means positioning said bridge networks on one of said objects; a plurality of substantially similar cylindrically shaped magnetic pins, said pins having a radius substantially equal to the smaller of the dimensions of said rectangular core ends; means positioning and holding said pins on the other of said objects with the cylindrical sides of said pins in contact with each other and with the longitudinal axes of said pins passing through a predetermined line on said other object; means positioning said two objects for relative movement with each other so that said pins are in the vicinity of but spaced from said ends of said cores and so that the direction of said relative movement is substantially along said predetermined line and substantially along said smaller end dimension of said cores; and second output means coupled between said first output means for combining said electrical signals.

15. A device for producing an electrical signal having a phase indicative of the relative position of two objects comprising: a first bridge network having a first magnetic core having one end thereof that is substantially plane, said one end being in the shape of a rectangle having a predetermined width, a first coil wound on said first core near said one end thereof, a second magnetic core substantially similar to said first core, a second coil substantially similar to said first coil wound around said second core near said one end thereof, means positioning said cores from each other a distance substantially equal to an odd integral multiple of said predetermined width with said one end of said cores lying in a common plane, a balancing resistor having a movable contact, means coupling one end of said resistor to one end of said first coil and the other end of said resistor to one end of said second coil, an alternating current source having a center tap, means coupling said alternating current source between the other ends of said coils, and first output means coupled between said movable contact and said center tap for deriving said electrical signal; a second bridge network substantially similar to said first bridge network; means positioning said bridge networks on one of said objects; a plurality of substantially similar cylindrically shaped magnetic pins, said pins having a radius substantially equal to said predetermined width of said core ends; means positioning and holding said pins on the other of said objects with the cylindrical sides of said pins in contact with each other and with the longitudinal axes of said pins substantially parallel to each other; said longitudinal axes passing through a predetermined line on said other object; means positioning said two objects for relative movement with each other so that said pins are in the vicinity of but spaced from said one end of said cores and so that the direction of said relative movement is substantially along said predetermined line and substantially parallel to said predetermined end width; and second output means coupled between said first output means for combining said electrical signals.

16. A device for producing an electrical signal having a phase indicative of the relative position of two objects comprising: a first bridge network having a first core unit having a pair of substantially similar C-shaped magnetic cores each having plane ends that lie in a single plane and that have the shape of a rectangle having a predetermined width, a coil wound on each of said cores, said coils being substantially similar, first means connecting said coils in series, a second core unit substantially similar to said first core unit and including said cores, said coils, and said first means connecting said coils in series, a balancing resistor having a movable contact, means coupling one end of said resistor to one free end of said coils of said first core unit and the other end of said resistor to one free end of said coils of said second core unit, an alternating current source having a center tap, means coupling said alternating current source between the other free ends of said coils of said first and second core units, means positioning the respective cores of each of said core units in a symmetrical manner on opposite sides of a unit axis with said ends of said cores in the vicinity of each other to form an air gap along said unit axis and with said cores lying in a common plane, means positioning said core units with said common plane and unit axis of said first core unit substantially parallel to said common plane and unit axis of said second core unit, said common planes being spaced from each other a distance substantially equal to an odd integral multiple of said predetermined width, and first output means coupled between said movable contact and said center tap for deriving said electrical signal; a second bridge network substantially similar to said first bridge network; means positioning said bridge networks on one of said objects; a plurality of substantially similar cylindrically shaped magnetic pins, said pins having a radius substantially equal to said predetermined width of said core ends; means positioning and holding said pins on the other of said objects with the cylindrical sides of said pins in contact with each other and with the longitudinal axes of said pins substantially parallel to each other, said longitudinal axes passing through a predetermined line on said other object; means positioning said two objects for relative movement with each other so that said pins are positioned in said air gaps but are spaced from said ends of said cores and so that the direction of said relative movement is substantially along said predetermined line and so that said longitudinal axes are substantially parallel to said unit axes; and second output means coupled between said first output means for combining said electrical signals.

References Cited in the file of this patent
UNITED STATES PATENTS 2,848,698    Howey et al.     Aug. 19, 1958

UNITED STATES PATENT OFFICE
CERTIFICATE OF CORRECTION

Patent No. 3,010,063　　　　　　　　　　　　　　November 21, 1961

John M. Rhoades

It is hereby certified that error appears in the above numbered patent requiring correction and that the said Letters Patent should read as corrected below.

Column 2, line 55, after "unit" insert -- 25 --; column 5, line 50, for "preferably" read -- preferable --; column 8, line 24, for "phase" read -- phases --; column 11, line 58, after "cores" insert -- each --.

Signed and sealed this 19th day of June 1962.

(SEAL)
Attest:

ERNEST W. SWIDER
Attesting Officer

DAVID L. LADD
Commissioner of Patent